April 5, 1938.   H. M. KESTERTON   2,113,512
CLUTCH
Filed July 14, 1936

H. M. Kesterton
Inventor
By: Glascock Downing & Seebold
Attys

Patented Apr. 5, 1938

2,113,512

UNITED STATES PATENT OFFICE 2,113,512

CLUTCH

Henry Martin Kesterton, Wroxall, near Warwick, England

Application July 14, 1936, Serial No. 90,604
In Great Britain July 19, 1935

2 Claims. (Cl. 192—47)

This invention has for its object to provide an improved clutch for use in the transmission of mechanical power from one member to another, and more particularly for use in or in combination with the variable speed transmission gears used on motor vehicles, lathe and other machine tool headstocks, and like purposes.

The invention comprises the combination of a pair of concentric parts forming driving and driven members, one of which is slidable axially with respect to the other, and the complementary peripheries of which are of circular and polygonal form respectively, and connecting rollers of barrel shape mounted between the said peripheries with their axes in a plane at right angles to the axis of the said members.

In the accompanying sheet of explanatory drawings:—

Figure 1:
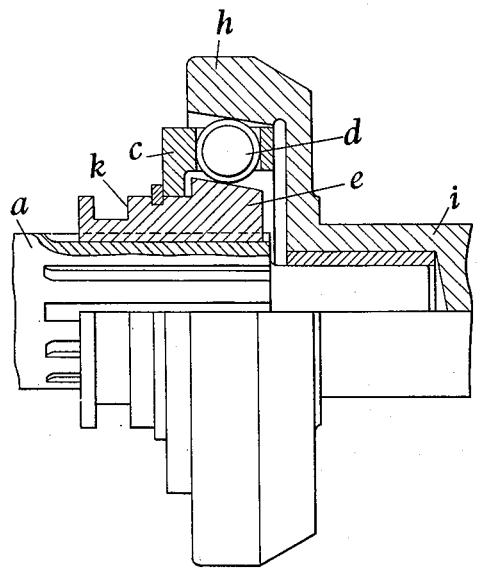
Figure 1 is a half sectional side elevation of a clutch constructed in accordance with this invention.
Figure 2:
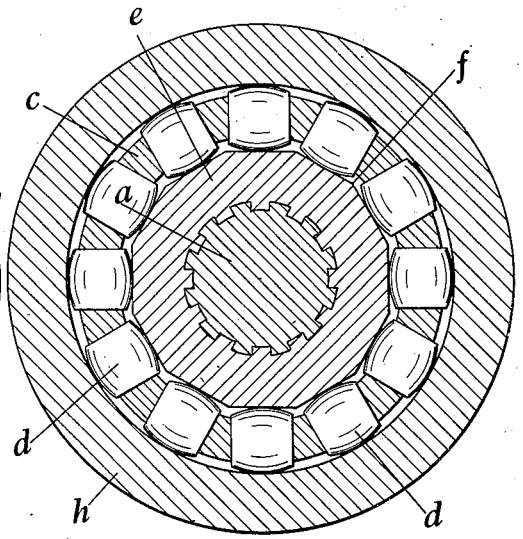
Figure 2 is a cross section of the clutch.

Referring to Figures 1 and 2, the driving shaft is represented by $a$ and the driven shaft by $i$. The inner clutch member $e$ is splined and axially slidable on the shaft $a$, and the outer clutch member $h$ is formed with or secured to the shaft $i$. The rollers $d$ are mounted in a cage $c$ which is rotatably mounted on and is slidable with the member $e$.

The rollers are of barrel shape and are arranged with their axes in a plane at right angles to the clutch. Also the surfaces of the members $e$, $h$ which co-operate with the rollers are in the form of conical frusta. The inner surface of the member $h$ is circular and the part $f$ of the outer surface of the member $e$ is of polygonal form. Axial movement can be given to the member $e$ in any convenient manner as, for example, by a slidable arm engaging a groove $k$. To bring the clutch into action the member $e$ is allowed to move to the right under the action of a spring (not shown). This causes the parts $e$, $h$ to be brought into the relationship in which the rollers $d$ can effect a driving connection between them. To release the clutch the member $e$ is moved to the left against the action of the spring. By this movement the rollers $d$ are moved clear of the inner periphery of the part $h$.

Figure 3:
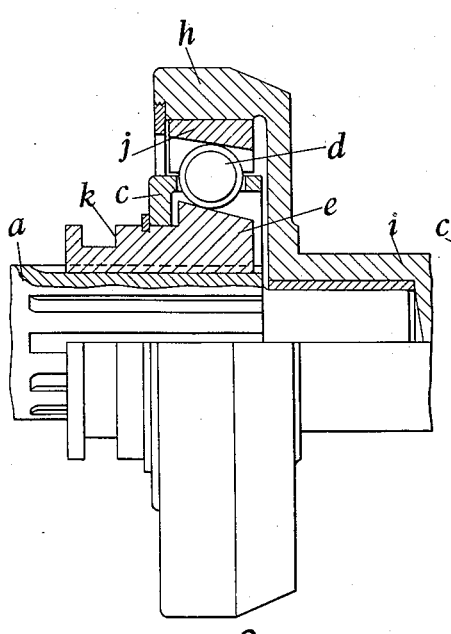
Figures 3 and 4 are respectively similar views to Figures 1 and 2 illustrating a modified form of my improved clutch.
Figure 4:
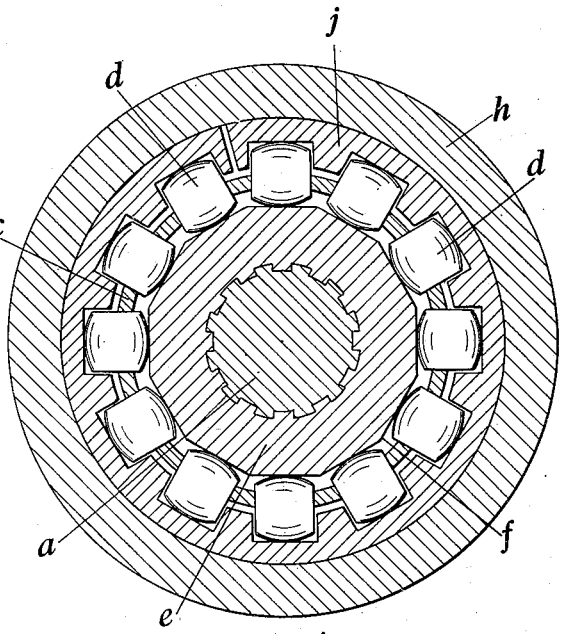

By using rollers of barrel shape, and arranging their axes in a plane at right angles to that of the shafts $a$, $i$, I am able greatly to facilitate axial movement of the member $e$ when the clutch is transmitting a heavy load. To minimize shock when the clutch is brought into action I may provide a frictional driving connection between the rollers $d$ and the annular member $h$. An example of this is shown in Figures 3 and 4. Within the part $h$ (the inner peripheral surface of which may be parallel with the axis of the mechanism) is arranged a divided and expansible ring $j$. Alternatively this ring may consist of a plurality of separate segments. The inner surface of the ring is tapered. Moreover the said surface is gapped or recessed to receive the rollers $d$ as will be seen clearly in Figure 4. The clutch is put out of action by moving the rollers to the left as above described. To bring the clutch into action the rollers are moved to the right. The effect of this movement is to expand the ring $j$ into driving connection with the part $h$. As the part $j$ engages the part $h$ frictionally the connection between the driving and driven shafts is effected without shock.

The invention is not limited to the examples above described of my improved clutch as subordinate details may be varied without departing from the essential features of the invention. Also the parts herein described as the driving and driven shafts may be caused to operate as driven and driving shafts.

Clutch mechanisms as above described are applicable to a variety of purposes, and they are especially adapted for use in the variable speed gear boxes of motor vehicles, or the headstocks of various forms of machine tools, to facilitate gear changing operations. The clutch may be arranged between the usual variable speed gear and the driven shaft, or it may be incorporated in any convenient part of the gear. On a motor vehicle it may be arranged between the gear box and the engine.

Having thus described my invention what I claim as new and desire to secure by Letters Patent is:—

1. A clutch comprising the combination of a pair of concentric parts forming driving and driven members, one of which is slidable axially with respect to the other, and the complementary peripheries of which are of circular and polygonal form respectively, and connecting rollers of barrel shape mounted between the said peripheries with their axes in a plane at right angles to the axis of the said members, substantially as described.

2. A clutch as claimed in claim 1 in which the inner of the said members is formed with a polygonal outer periphery lying parallel to the axis of the said members, and in which the outer of the said members is formed with an inner circular periphery of conical form, the said rollers being mounted between these peripheries, substantially as described.

HENRY MARTIN KESTERTON.